United States Patent
Suzuki

(10) Patent No.: US 8,676,408 B2
(45) Date of Patent: Mar. 18, 2014

(54) UNMANNED AIRCRAFT AND AERIAL SURVEILLANCE SYSTEM FOR UNMANNED AIRCRAFT

(75) Inventor: Satoshi Suzuki, Aichi (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 216 days.

(21) Appl. No.: 13/058,566

(22) PCT Filed: Nov. 20, 2009

(86) PCT No.: PCT/JP2009/069723
§ 371 (c)(1),
(2), (4) Date: Feb. 11, 2011

(87) PCT Pub. No.: WO2010/064548
PCT Pub. Date: Jun. 10, 2010

(65) Prior Publication Data
US 2011/0137498 A1    Jun. 9, 2011

(30) Foreign Application Priority Data
Dec. 3, 2008  (JP) .................................. 2008-309123

(51) Int. Cl.
*G05D 1/00* (2006.01)

(52) U.S. Cl.
USPC ................... 701/4; 348/144; 356/5.1

(58) Field of Classification Search
USPC .............. 701/3, 4, 28; 348/144, 146, E07.85; 356/4.01, 5.01, 437, 3.01, 4.1, 5.1, 3.1
See application file for complete search history.

(56) References Cited

U.S. PATENT DOCUMENTS

| | | | |
|---|---|---|---|
| 5,005,083 A * | 4/1991 | Grage et al. | 348/588 |
| 5,077,609 A * | 12/1991 | Manelphe | 348/144 |
| 5,581,250 A * | 12/1996 | Khvilivitzky | 340/961 |
| 6,410,987 B1 * | 6/2002 | Kanemoto et al. | 257/777 |
| 6,903,343 B2 * | 6/2005 | Amon et al. | 250/353 |
| 7,693,617 B2 * | 4/2010 | Dockter et al. | 701/3 |
| 7,955,006 B1 * | 6/2011 | Harvey | 396/428 |
| 8,139,205 B2 * | 3/2012 | McKaughan et al. | 356/5.01 |

FOREIGN PATENT DOCUMENTS

| | | |
|---|---|---|
| JP | 3-213498 | 9/1991 |
| JP | 7-321534 | 12/1995 |
| JP | 2004-156944 | 6/2004 |
| JP | 2005-37186 | 2/2005 |
| JP | 2005-207862 | 8/2005 |

OTHER PUBLICATIONS

Japanese Office Action issued Feb. 2, 2012 in corresponding Japanese Patent Application No. 2008-309123 with partial English translation.

(Continued)

*Primary Examiner* — Helal A Algahaim
*Assistant Examiner* — Shardul Patel
(74) *Attorney, Agent, or Firm* — Wenderoth, Lind & Ponack, L.L.P.

(57) ABSTRACT

An unmanned aircraft includes a camera, a laser ranging system and a driving unit. The laser ranging system measures a distance to an object in the field of view of the camera. The driving unit rotates the field of view. Thus, it is possible to acquire relative position data of the object around the unmanned aircraft with a small and light-weight unit.

10 Claims, 6 Drawing Sheets

(56) References Cited

OTHER PUBLICATIONS

International Search Report issued Dec. 28, 2009 in International (PCT) Application No. PCT/JP2009/069723.

Robert Bernier et al., "DSA Radar—Development Report" (Presented at AUVSI 2005, Baltimore, USA, Jun. 28-30, 2005), Amphitech Systems Inc., pp. 1-13.

* cited by examiner

UNMANNED AIRCRAFT AND AERIAL SURVEILLANCE SYSTEM FOR UNMANNED AIRCRAFT

TECHNICAL FIELD

The present invention is related to an unmanned aircraft, especially to an aerial surveillance of the unmanned aircraft.

BACKGROUND ART

TCAS2 (Traffic alert and Collision Avoidance System 2) is known as a system for avoiding midair collision of aircrafts. The aircraft installed with TCAS2 inquires to other aircrafts around the own aircraft and responds to the inquiry from the other aircraft. Based on the inquiry and response, TCAS2 judges whether or not other aircrafts having a risk of the midair collision exist around the own aircraft, and warns a pilot of the existence of the other aircrafts having the risk of the midair collision. The installation of TCAS2 is obligated in a turbine aircraft on which 19 or more passengers board.

However, because the installation of TCAS2 is not obligated to all aircraft, there is a problem of avoidance of midair collision with another aircraft without the installation of TCAS2. In a manned aircraft that a pilot is on board, it is possible to avoid the midair collision with the aircraft without the installation of TCAS2 through visual surveillance of the neighborhood by the pilot. Because an unmanned aircraft is controlled through a remote control by a pilot who is not on board, it is required to install a surveillance system in the unmanned aircraft in place of the visual surveillance.

U.S. Pat. No. 5,581,250 discloses a technique to avoid midair collision by using a TV (television) camera which monitors the front direction of the unmanned aircraft. According to this U.S. Pat. No. 5,581,250, two TV cameras are installed in both wings of the unmanned aircraft for surveillance of the front direction so as to calculate a distance to an obstacle in front of the unmanned aircraft based on images acquired from these TV cameras. However, it would be difficult to guarantee a necessary range accuracy due to the influence of twist of wings.

"DSA Radar-Development Report" (AUVSI 2005 Jun. 26 to 30, 2005) discloses a technique that when another aircraft exists in front of the unmanned aircraft, a distance to the other aircraft and an azimuth thereof are detected by using a millimeter-wave radar which is installed in the neighborhood of the nose of the unmanned aircraft, so as to avoid the midair collision. However, it would be difficult to apply the millimeter-wave radar to a small unmanned aircraft because the millimeter-wave radar is heavy and large in a consumed power amount.

CITATION LIST

Patent Literature

[Patent literature 1]: U.S. Pat. No. 5,581,250

Non-Patent Literature

[Non-Patent Literature 1]
"DSA Radar-Development Report" (AUVSI 2005 Jun. 26 to 30, 2005)

SUMMARY OF THE INVENTION

An object of the present invention is to provide an unmanned aircraft in which relative position data of an object around the unmanned aircraft can be acquired by a small and lightweight unit, an aerial surveillance system for the unmanned aircraft, and an aerial surveillance method for the unmanned aircraft.

An unmanned aircraft according to a first aspect of the present invention includes a camera, a laser ranging system configured to measure a distance to an object in a field of view of the camera, and a driving unit configured to rotate the field of view.

Therefore, relative position data of the object can be acquired with a small and light-weight unit without using a millimeter-wave radar.

Preferably, the driving unit drives a rotary optical system which contains the camera and the laser ranging system, to rotate around a rotation axis.

Therefore, the laser ranging system can always measure the distance to the object in the field of view of the camera.

Preferably, the rotation axis is orthogonal to a longitudinal direction of the unmanned aircraft and a lateral direction thereof.

Therefore, front and back directions and left and right directions from the unmanned aircraft can be monitored.

Preferably, the rotary optical system outputs a laser beam of an ellipsoidal shape having a long axis along the rotation axis. The laser ranging system measures the distance to the object based on the laser beam.

Therefore, it is not necessary to provide a mechanism to drive the laser beam outputted from the rotary optical system to be swung along the rotation axis.

Preferably, the unmanned aircraft further includes a panoramic image data generating section. The camera images a plurality of images at different rotation angles of the rotary optical system, respectively. The panoramic image data generating section generates panoramic image data by combining the plurality of images.

According to the panoramic image data, it is possible to grasp the surrounding region of the unmanned aircraft.

Preferably, the unmanned aircraft further includes an azimuth detecting section. The panoramic image data contains image data of the object. The azimuth detecting section detects the azimuth of the object based on the panoramic image data. The rotary optical system outputs the laser beam based on the azimuth and the rotation angle of the rotary optical system. The laser ranging system measures the distance to the object based on the laser beam.

Therefore, the distance to the object is surely measured and moreover the wasteful irradiation of the laser beam is prevented.

Preferably, the unmanned aircraft includes an azimuth detecting section, a relative height calculating section, a communication unit, a flight control unit, a control surface system and a thrust system. The panoramic image data contains the image data of the object. The azimuth detecting section detects the azimuth of the object based on the panoramic image data. The relative height calculating section calculates a relative height of the object to the unmanned aircraft based on the panoramic image data and the distance. The communication unit transmits the panoramic image data, the azimuth data, the distance data and the relative height data of the relative height from the unmanned aircraft. The communication unit receives a flight control command from an external system to the unmanned aircraft. The flight control unit controls the control surface system or the thrust system based on the flight control command.

Therefore, the unmanned aircraft can avoid the midair collision with the object.

The aerial surveillance system for the unmanned aircraft according to a second aspect of the present invention includes a camera, a laser ranging system configured to measure a distance to an object in a field of view of the camera and a driving unit configured to rotate the field of view.

An aerial surveillance method of the unmanned aircraft according to a third aspect of the present invention includes rotating a field of view of a camera, and measuring a distance to an object in the field of view using a laser ranging system.

Preferably, the rotating a field of view of the camera includes rotating a rotary optical system which contains the camera and the laser ranging system, around a rotation axis.

Preferably, the measuring a distance contains outputting a laser beam of an ellipsoidal shape long in a direction of the rotation axis from the rotary optical system, and measuring the distance to the object by the laser ranging system based on the laser beam.

Preferably, the aerial surveillance method of the unmanned aircraft further includes imaging a plurality of images at different rotation angles of the rotary optical system by the camera, and generating a panoramic image data by combining the plurality of images.

The panoramic image data contains image data of the object. Preferably, the measuring a distance includes detecting an azimuth of the object based on the panoramic image data, outputting the laser beam from the rotary optical system based on the azimuth and the rotation angle of the rotary optical system, and measuring the distance to the object by the laser ranging system based on the laser beam.

The panoramic image data contains image data of the object. Preferably, the aerial surveillance method of the unmanned aircraft further includes detecting the azimuth of the object based on the panoramic image data, calculating a relative height of the object to the unmanned aircraft based on the panoramic image data and the distance, transmitting the panoramic image data, azimuth data indicating the detected azimuth, distance data indicating the distance, and relative height data indicating the relative height from the unmanned aircraft to an external system to the unmanned aircraft, receiving a flight control command from the external system to the unmanned aircraft, and controlling a control surface system or a thrust system of the unmanned aircraft based on the flight control command.

According to the present invention, the unmanned aircraft, which can acquire relative position data of the object around the unmanned aircraft with a small and light-weight unit, the aerial surveillance system for the unmanned aircraft, and the aerial surveillance method of the unmanned aircraft are provided.

BRIEF DESCRIPTION OF THE DRAWINGS

The above object, other objects, the advantageous effects and features of the present invention become clear from the description of the embodiments in conjunction with the following drawings.

DESCRIPTION OF EMBODIMENTS

Hereinafter, an unmanned aircraft, and an aerial surveillance system for the unmanned aircraft by the present invention will be described below with reference to the attached drawings.

[First Embodiment]

Figure 1:
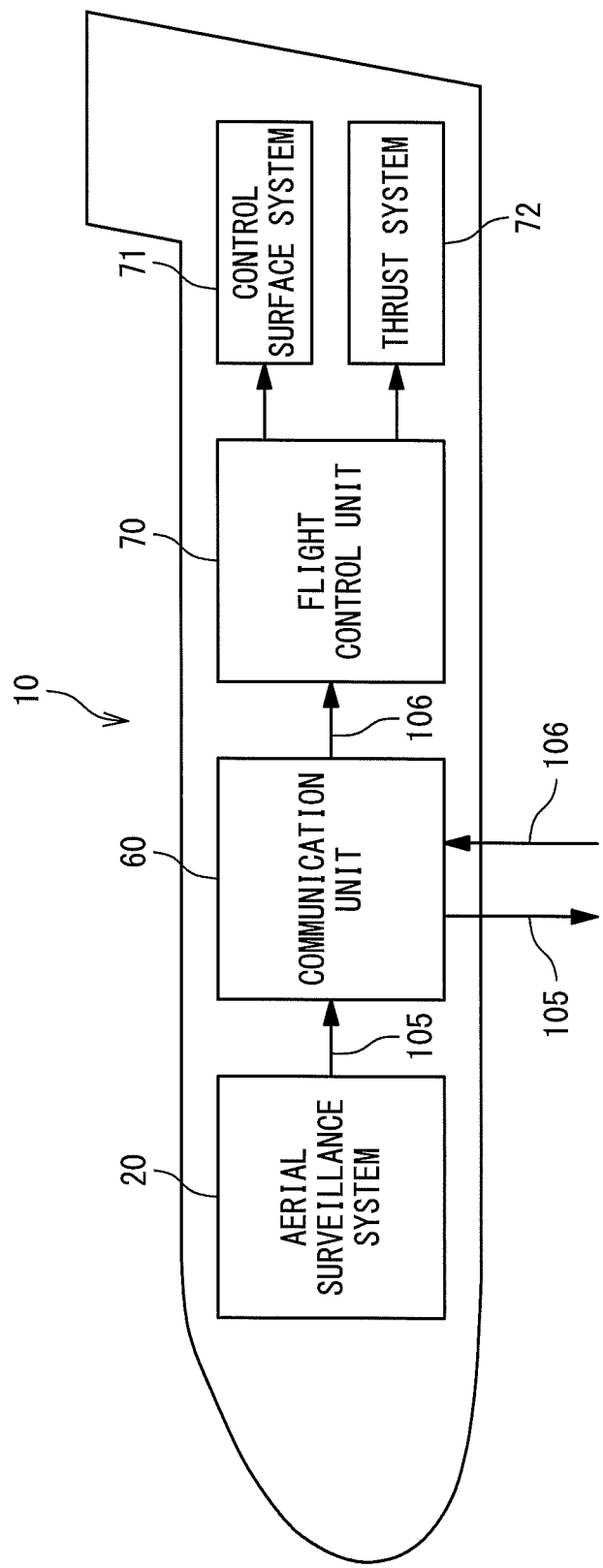
FIG. 1 is a block diagram showing an unmanned aircraft according to a first embodiment of the present invention.

Referring to FIG. 1, an unmanned aircraft 10 according to the first embodiment of the present invention includes an aerial surveillance system 20, a communication unit 60, a flight control unit 70, a control surface system 71 and a thrust system 72. The aerial surveillance system 20 acquires aerial surveillance data 105 which contains relative position data of flight objects which exist around the unmanned aircraft 10. The communication unit 60 transmits the aerial surveillance data 105 to an external system to the unmanned aircraft to be described later and receives a flight control command 106 from the external system. The flight control unit 70 controls the control surface system 71 or the thrust system 72 based on the flight control command 106.

Figure 2:
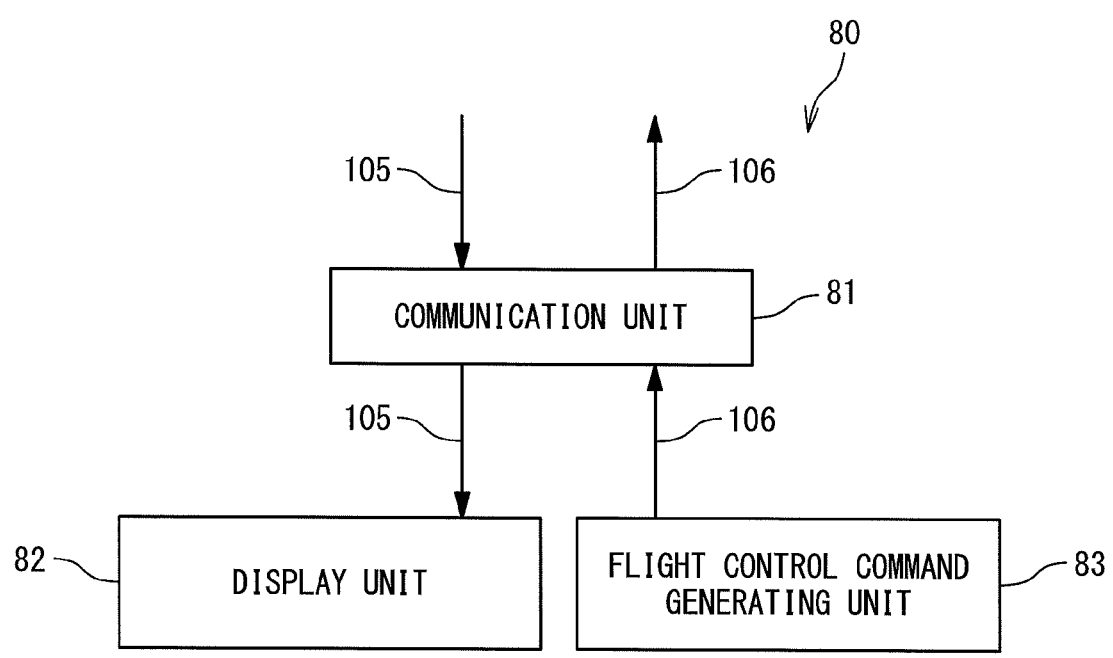
FIG. 2 is a block diagram showing an external system to the unmanned aircraft in the first embodiment.

Referring to FIG. 2, an external system 80 is provided with a communication unit 81, a display unit 82 and a flight control command generating unit 83. The flight control command generating unit 83 is provided with an input section such as a control stick and a throttle lever. The communication unit 81 receives the aerial surveillance data 105 from the unmanned aircraft 10. The display unit 82 displays the aerial surveillance data 105. A pilot operates the input section of the flight control command generating unit 83 in order to avoid midair collision of the flight object and the unmanned aircraft 10 based on a display of the display unit 82. The flight control command generating unit 83 generates the above-mentioned flight control command 106 based on the operation by the pilot. The communication unit 81 transmits the flight control command 106 to the unmanned aircraft 10. It should be noted that the external system 80 may be installed in any of a building, a vehicle, a ship and another aircraft.

Figure 3:
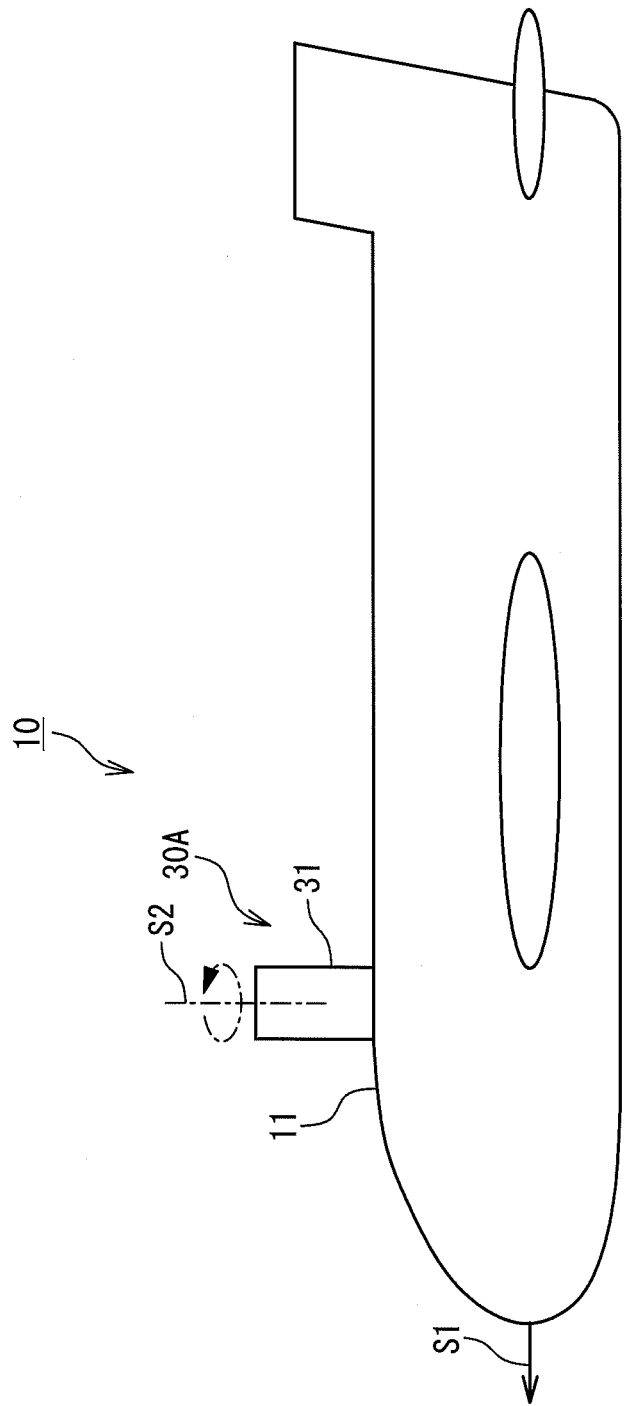
FIG. 3 is an outer appearance of the unmanned aircraft.

FIG. 3 shows the outward appearance of the unmanned aircraft 10. The aerial surveillance system 20 is provided with a rotary optical system 30A. The rotary optical system 30A is provided with an outer cylinder 31 projecting upwardly from the nose 11 of the unmanned aircraft 10. The outer cylinder 31 has a columnar shape. The rotary optical system 30A rotates around a rotation axis S2 which is orthogonal to a longitudinal direction S1 of the unmanned aircraft 10 and a lateral direction thereof. For example, the rotation axis S2 is coincident with a central axis of the outer cylinder 31.

Figure 4:
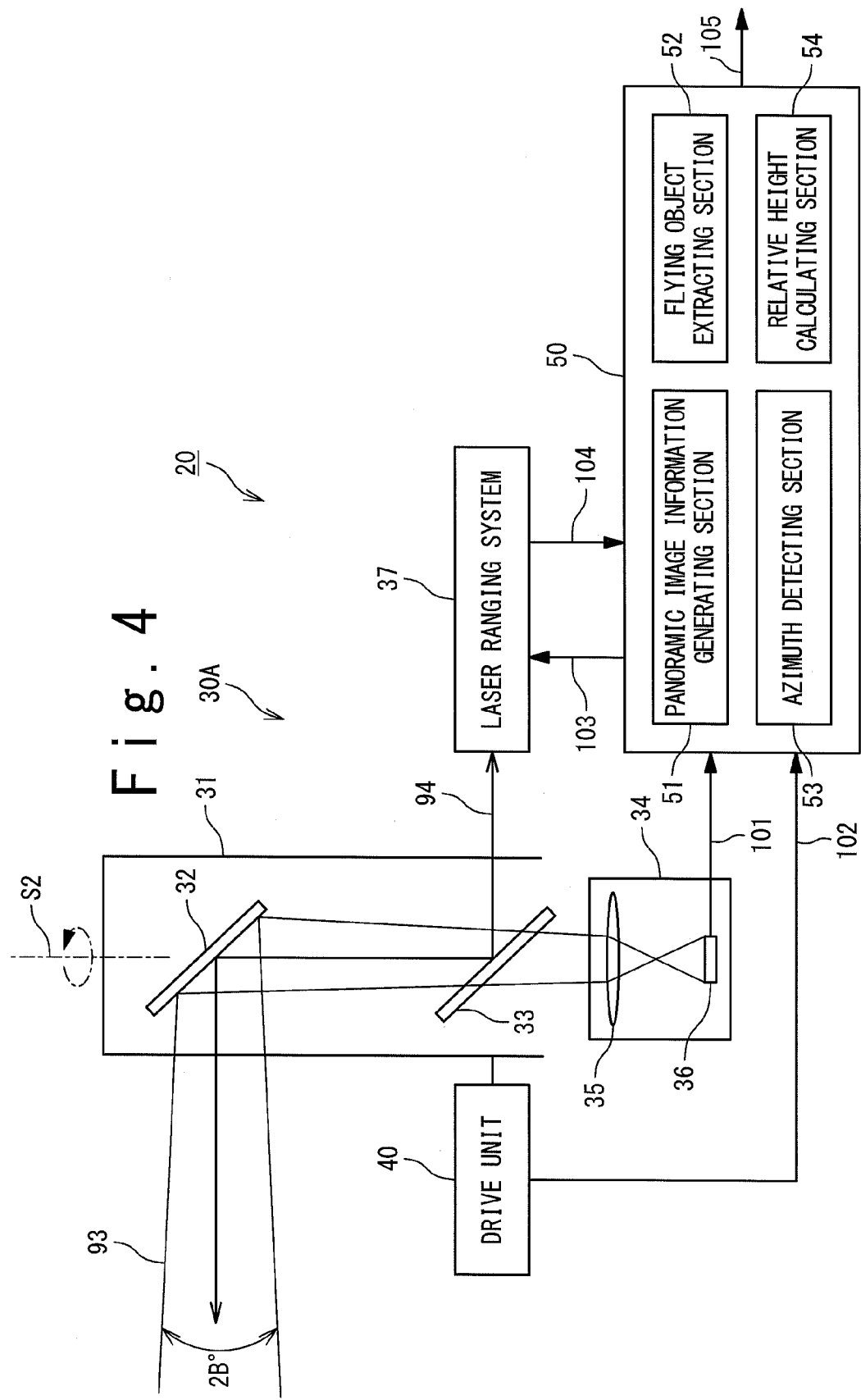
FIG. 4 is a block diagram showing the aerial surveillance system in the first embodiment.

Referring to FIG. 4, the aerial surveillance system 20 will be described. The aerial surveillance system 20 is provided with a driving unit 40 and a signal processing unit 50 in addition to the above-mentioned rotary optical system 30A. In addition to the above-mentioned outer cylinder 31, the rotary optical system 30A is provided with a reflector 32, a beam splitter 33, a camera 34 and a laser ranging system 37. The laser ranging system 37 outputs and receives a laser beam 94 to the optical axis of the camera 34. The driving unit 40 drives the rotary optical system 30A to rotate around the rotation axis S2, and outputs rotation angle data 102 indicative of a rotation angle of the rotary optical system 30A to the signal processing unit 50. The driving unit 40 drives the rotary optical system 30A to rotate continuously into one direction. The outer cylinder 31, the reflector 32, the beam splitter 33, the camera 34 and the laser ranging system 37 rotate together with the rotary optical system 30A. The camera 34 is provided with a condenser lens 35 and a 2-dimensional image sensor 36. The signal processing unit 50 is provided with a panoramic image data generating section 51, a flight object extracting section 52, an azimuth detecting section 53 and a relative height calculating section 54. For example, the panoramic image data generating section 51, the flight object extracting section 52, the azimuth detecting section 53 and the relative height calculating section 54 may be realized by a computer which operates based on a computer program recorded in a transitory storage medium.

The camera 34 images a surrounding region in a field of view 93 through the reflector 32 and the beam splitter 33. Light from a point in the field of view 93 is reflected with the reflector 32, transmits through the beam splitter 33 and the condensing lens 35, and reaches the 2-dimensional image sensor 36. The camera 34 generates image data 101 indicating an image based on the light which has reached the 2-dimensional image sensor 36. The camera 34 is a TV (television) camera which generates the image data 101 based on the light in a visible wavelength region or an infrared camera which generates the image data 101 based on the light in an infrared wavelength region. When the camera 34 generates the image data 101 based on the light in the visible wavelength region, the surveillance that is equivalent to the visual surveillance by a pilot is provided. When the camera 34 is the infrared camera, the aerial surveillance system 20 is effective in night. The field of view 93 has the angle of 2B degrees in a vertical direction (along the rotation axis S2) and has the angle of A degrees in a horizontal direction (a circumferential direction around rotation axis S2). The field of view 93 is rotated by driving the rotary optical system 30A to rotate by the driving unit 40. Therefore, the camera 34 can image the surrounding region of the unmanned aircraft 10 in the front and back directions and the light and right directions.

The laser ranging system 37 emits a laser beam 94 in response to an emission command 103 outputted from the signal processing unit 50. The laser beam 94 is reflected by the beam splitter 33 and the reflector 32 and is irradiated from the rotary optical system 30A. The laser beam 94 outputted from the rotary optical system 30A moves forward in the field of view 93. When the laser beam 94 is reflected from a flight object in the field of view 93, the laser beam 34 is reflected by the reflector 32 and the beam splitter 33 and reaches the laser ranging system 37. The laser ranging system 37 measures (detects) a distance to the flight object based on the laser beam 94. The laser ranging system 37 outputs distance data 104 indicating the distance to the flight object, to signal processing unit 50. The signal processing unit 50 generates aerial surveillance data 105 based on the image data 101, the rotation angle data 102 and the distance data 104.

Hereinafter, the aerial surveillance method of the unmanned aircraft according to this embodiment will be described.

The camera 34 images a plurality of images at a plurality of rotation angles, which are different from each other, of the rotary optical system 30A. For example, the camera 34 images the image each time the rotation angle increases by C degrees and generates the image data 101 indicating the image. For example, the C degrees are a constant angle and are larger than 0 degrees and smaller than the A degrees. The panoramic image data generating section 51 generates panoramic image data indicative of a panoramic image obtained by combining the plurality of images based on the image data 101 and the rotation angle data 102.

Figure 5:
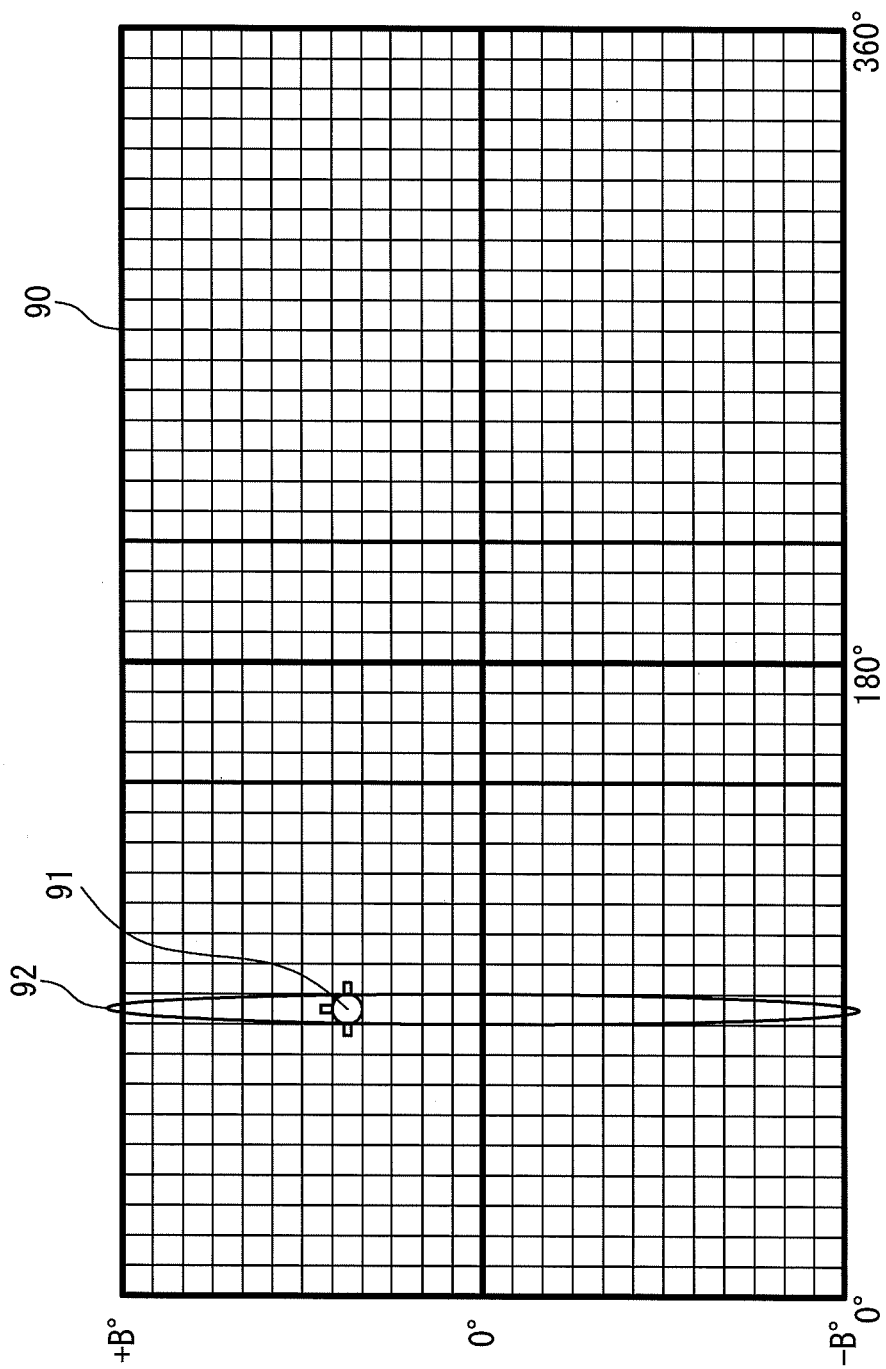
FIG. 5 shows a panoramic image.

The panoramic image 90 will be described with reference to FIG. 5. The horizontal (lateral) direction of the panoramic image 90 corresponds to the surrounding region around the rotation axis S2 for 360 degrees and the vertical (longitudinal) direction of the panoramic image 90 corresponds to an elevation angle in a range between −B degrees and +B degrees. Here, the elevation angle of an optional point on a plane that passes through the reflector 32 and is perpendicular to the rotation axis S2 is 0°. The panoramic image 90 contains a flight object image 91 as the image of the flight object around the unmanned aircraft 10.

The flight object extracting section 52 performs image processing based on the panoramic image data to extract the flight object image 91. The azimuth detecting section 53 detects the azimuth (the angle position around the rotation axis S2) of the flight object based on the panoramic image data.

The signal processing unit 50 outputs the emission command 103 such that the laser beam 94 is emitted toward the flight object based on the azimuth of the flight object and the rotation angle data 102 indicating the rotation angle of the rotary optical system 30A. The laser ranging system 37 measures the distance to the flight object in response to the emission command 103 as described above. Thus, the distance to the flight object is surely measured and the wasteful emission of the laser beam 94 is prevented.

The relative height calculating section 54 detects the elevation angle of the flight object based on the panoramic image data and calculates a length with a sign of a perpendicular line extending from the flight object to the plane which passes through the reflector 32 and is perpendicular to the rotation axis S2, based on the elevation angle of the flight object and the distance to the flight object. Here, when the elevation angle of the flight object is positive, the length of the perpendicular line has a positive sign, and when the elevation angle of the flight object is negative, the length of the perpendicular line has a negative sign. When the unmanned aircraft 10 is in a horizontal flight, the length with the sign of the perpendicular line indicates a relative height of the flight object to the unmanned aircraft 10.

The signal processing unit 50 outputs the aerial surveillance data 105 which contains the panoramic image data and the relative position data of the flight object to the communication unit 60. The relative position data of the flight object contains the azimuth data indicating the azimuth of the flight object, the distance data indicating the distance to the flight object and the relative height data indicating the relative height of the flight object (the length with the sign of the perpendicular line).

The communication unit 60 transmits the aerial surveillance data 105 to the external system 80. The display unit 82 displays the panoramic image 90, the azimuth of the flight object, the distance and the relative height based on the aerial surveillance data 105. The panoramic image 90 is renewed every time the rotary optical system 30A rotates once. The pilot operates the input section of the flight control command generating unit 83 so as to avoid the midair collision of the unmanned aircraft 10 with the flight object based on the display on the display unit 82. The flight control command generating unit 83 generates the flight control command 106 based on the operation by the pilot. The communication unit 60 receives the flight control command 106 from the external system 80. The flight control unit 70 controls the control surface system 71 or the thrust system 72 based on the flight control command 106.

In the present embodiment, it is desirable that the laser beam 94 outputted from the rotary optical system 30A has an ellipsoidal shape along the rotation axis S2. In this case, as shown in FIG. 5, the field 92 of radiation of the laser beam 94 is ranged between the elevation angle of −B degrees and the elevation angle of +B degrees. If the flight object image 91 is contained in the panoramic image 90, it is possible to measure the distance to the flight object without providing a mechanism to swing the laser beam 94 outputted from the rotary optical system 30A along the rotation axis S2. For example, the rotary optical system 30A shapes the laser beam 94 by a column concave lens (not shown) to have such a beam shape.

Also, in the present embodiment, the unmanned aircraft 10 may avoid the flight object without depending on the external system 80. In such a case, the signal processing unit 50 outputs the relative position data of the flight object to the flight control unit 70. The flight control unit 70 controls the control surface system 71 or the thrust system 72 based on the relative position data of the flight object.

[Second Embodiment]

Figure 6:
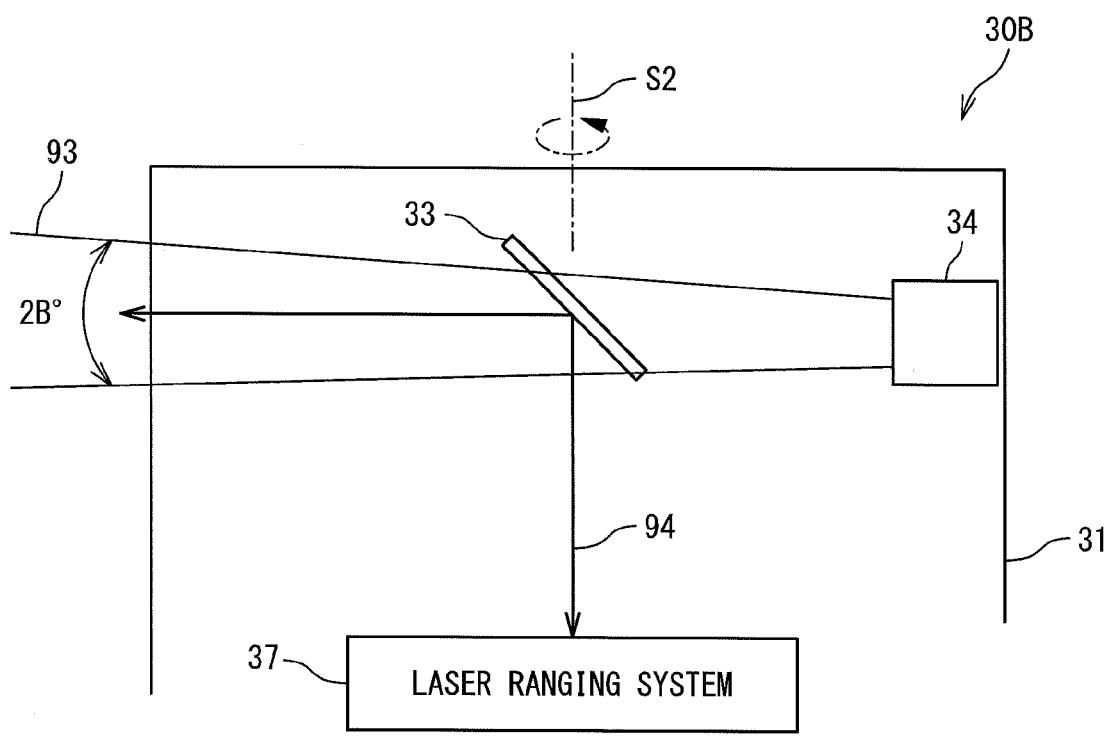
FIG. 6 is a block diagram showing a rotary optical system according to a second embodiment of the present invention.

Referring to FIG. 6, the unmanned aircraft, the aerial surveillance system for the unmanned aircraft and the aerial surveillance method of the unmanned aircraft according to a second embodiment of the present invention will be described. The unmanned aircraft, the aerial surveillance system for the unmanned aircraft and the aerial surveillance method of the unmanned aircraft according to the present embodiment are the same as those of according to the first embodiment except that the rotary optical system 30A is replaced by a rotary optical system 30B.

Like the rotary optical system 30A, the rotary optical system 30B is provided with an outer cylinder 31, the beam splitter 33, the camera 34 and the laser ranging system 37. However, the rotary optical system 30B is not provided with the reflector 32. The camera 34 images the image in the field of view 93 through the beam splitter 33. The light from a point in the field of view 93 transmits through the beam splitter 33 and reaches the camera 34. The camera 34 generates the image data 101 indicating the image based on the light which has reached. The laser beam 94 emitted from the laser ranging system 37 is reflected with the beam splitter 33 and is outputted from the rotary optical system 30B. The laser beam 94 outputted from the rotary optical system 30B moves forward in the field of view 93. When the laser beam 94 is reflected from the flight object in the field of view 93, the laser beam 94 is reflected with the beam splitter 33 and reaches the laser ranging system 37. The laser ranging system 37 measures (detects) the distance to the flight object based on the laser beam 94. The laser ranging system 37 outputs the distance data 104 indicating the distance to the flight object to the signal processing unit 50.

According to the present embodiment, although the outer cylinder 31 which is exposed from the fuselage section of the unmanned aircraft 10 becomes large, the structure of the rotary optical system 30B becomes simple.

Although the present invention has been described with reference to the embodiments, the present invention is not limited to the embodiments. Various modifications can be made to the embodiments. For example, in each of the above embodiments, the outer cylinder 31 may protrude downwardly from the nose 11 of the unmanned aircraft 10.

This patent application claims a priority based on Japan Patent Application No. JP 2008-309123 filed on Dec. 3, 2008 and the disclosure thereof is incorporated herein by reference.

The invention claimed is:

1. An unmanned aircraft comprising:
   a single housing including an optical system;
   a camera rotatable with said optical system and configured to receive a reception laser signal through an optical axis path including said optical system to generate an image in a field of view;
   a laser ranging system configured to output a laser beam as a laser signal through the optical axis path including said optical system and measure a distance to an object in the field of view based on the reception laser signal from the object through the optical axis path including said optical system; and
   a driving unit configured to continuously rotate said optical system and said camera around a rotation axis,
   wherein said driving unit rotates said laser ranging system around the rotation axis together with said optical system and said camera,
   wherein the unmanned aircraft further comprises a panoramic image data generating section,
   wherein said camera images a plurality of images at different angles of the rotation, respectively, and
   wherein said panoramic image data generating section generates panoramic image data by combining the plurality of images.

2. The unmanned aircraft according to claim 1, wherein the rotation axis is orthogonal to a longitudinal direction of the unmanned aircraft and a lateral direction thereof.

3. The unmanned aircraft according to claim 1, wherein the laser beam outputted from said laser ranging system has an ellipsoidal shape having a long axis along the rotation axis, and said laser ranging system measures the distance to the object based on the laser beam.

4. The unmanned aircraft according to claim 1, further comprising an azimuth detecting section,
   wherein the panoramic image data includes image data of the object,
   wherein said azimuth detecting section detects an azimuth of the object based on the panoramic image data,
   wherein said laser ranging system outputs the laser beam based on the azimuth and the rotation angle of the rotation, and
   wherein said laser ranging system measures the distance to the object based on the laser beam.

5. The unmanned aircraft according to claim 1, further comprising:
   an azimuth detecting section;
   a relative height calculating section;
   a communication unit;
   a flight control unit;
   a control surface system; and
   a thrust system,
   wherein the panoramic image data includes image data of the object,
   wherein said azimuth detecting section detects an azimuth of the object based on the panoramic image data,
   wherein said relative height calculating section calculates a relative height of the object to the unmanned aircraft based on the panoramic image data and the distance,
   wherein said communication unit transmits the panoramic image data, azimuth data indicating the azimuth, distance data indicating the distance and relative height data indicating the relative height to an external system,
   wherein said communication unit receives a flight control command from said external system, and
   wherein said flight control unit controls said control surface system or said thrust system based on the flight control command.

6. An aerial surveillance system for an unmanned aircraft, comprising:
- a single housing including an optical system;
- a camera rotatable with said optical system and configured to receive a reception laser signal through an optical axis path including said optical system to generate an image in a field of view;
- a laser ranging system configured to output a laser beam as a laser signal through the optical axis path including said optical system and measure a distance to an object in the field of view of said camera; and
- a driving unit configured to continuously rotate said optical system and said camera around a rotation axis,
- wherein said driving unit rotates said laser ranging system around the rotation axis together with said optical system and said camera,
- wherein the aerial surveillance system further comprises a panoramic image data generating section,
- wherein said camera images a plurality of images at different angles of the rotation, respectively, and
- wherein said panoramic image data generating section generates panoramic image data by combining the plurality of images.

7. An aerial surveillance method of an unmanned aircraft, comprising:
- continuously rotating a camera and an optical system around a rotation axis, the optical system being included in a single housing of the unmanned aircraft;
- outputting a laser beam as a laser signal through an optical axis path including the optical system from a laser ranging system; and
- measuring a distance to an object in the field of view based on a reception laser from the object through the optical axis path including the optical system by the laser ranging system,
- wherein said rotating includes rotating the laser ranging system around a rotation axis together with the optical system and the camera, and
- wherein the aerial surveillance method further comprises:
- imaging a plurality of images from the reception laser signal at different rotation angles of the rotation by the camera; and
- generating panoramic image data by combining the plurality of images.

8. The aerial surveillance method according to claim 7, wherein said measuring comprises:
- outputting the laser beam of an ellipsoidal shape long in a direction of the rotation axis from the rotary optical system; and
- measuring the distance to the object by the laser ranging system based on the reception laser signal.

9. The aerial surveillance method according to claim 7, wherein the panoramic image data includes image data of the object, and
- wherein said measuring comprises:
- detecting an azimuth of the object based on the panoramic image data;
- outputting the laser beam from the laser ranging system based on the azimuth and the rotation angle of the rotation; and
- measuring the distance to the object by the laser ranging system based on the reception laser signal.

10. The aerial surveillance method according to claim 7, wherein the panoramic image data includes image data of the object,
- wherein said aerial surveillance method further comprises:
- detecting an azimuth of the object based on the panoramic image data;
- calculating a relative height of the object to the unmanned aircraft based on the panoramic image data and the distance;
- transmitting the panoramic image data, azimuth data indicating the detected azimuth, distance data indicating the distance, and relative height data indicating the relative height from the unmanned aircraft to an external system;
- receiving a flight control command from the external system; and
- controlling a control surface system or a thrust system of the unmanned aircraft based on the flight control command.

* * * * *